June 7, 1960 D. W. MOYER 2,939,288
HYDRAULIC POWER TRANSMITTING MECHANISMS
Filed July 22, 1958 13 Sheets-Sheet 3

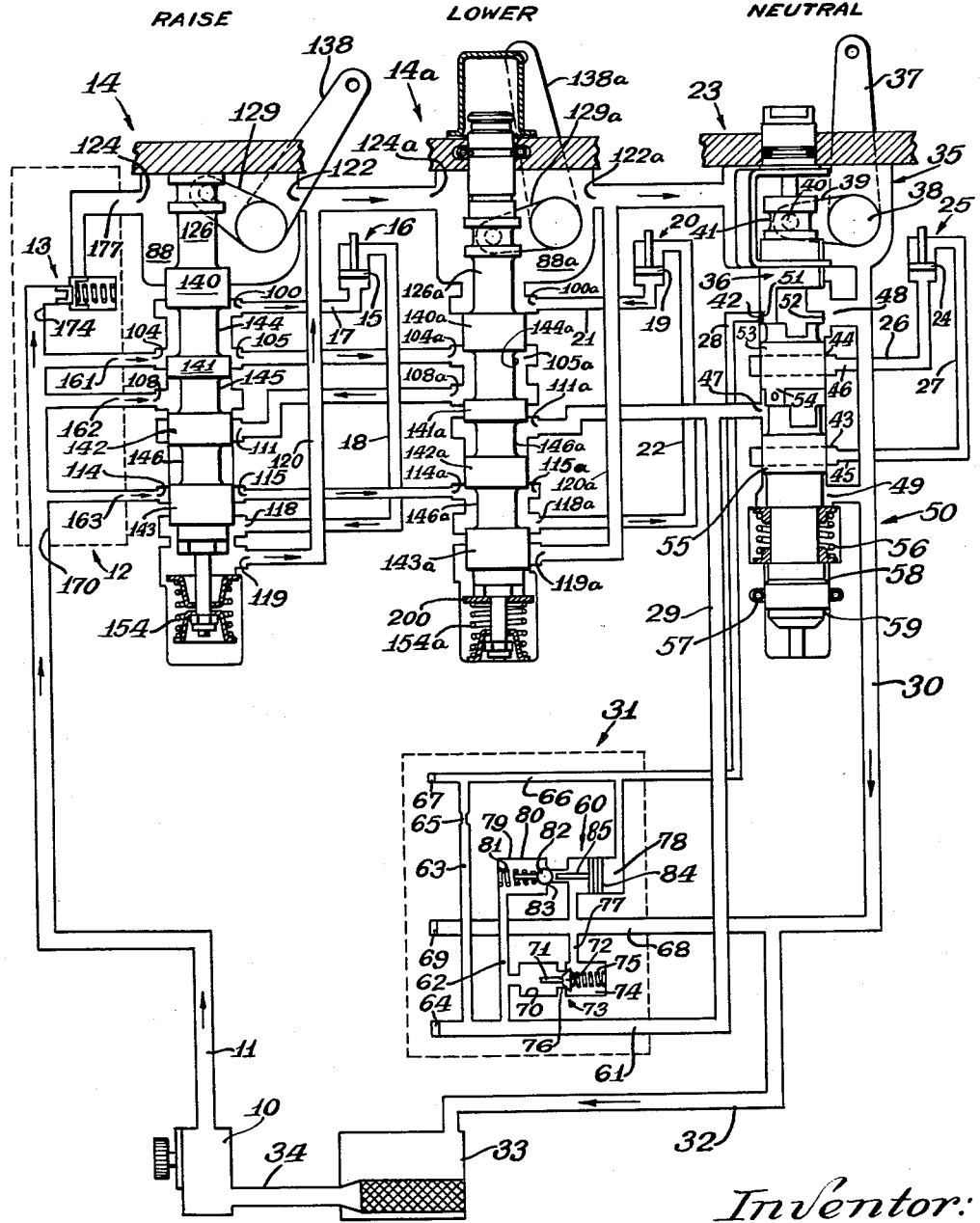

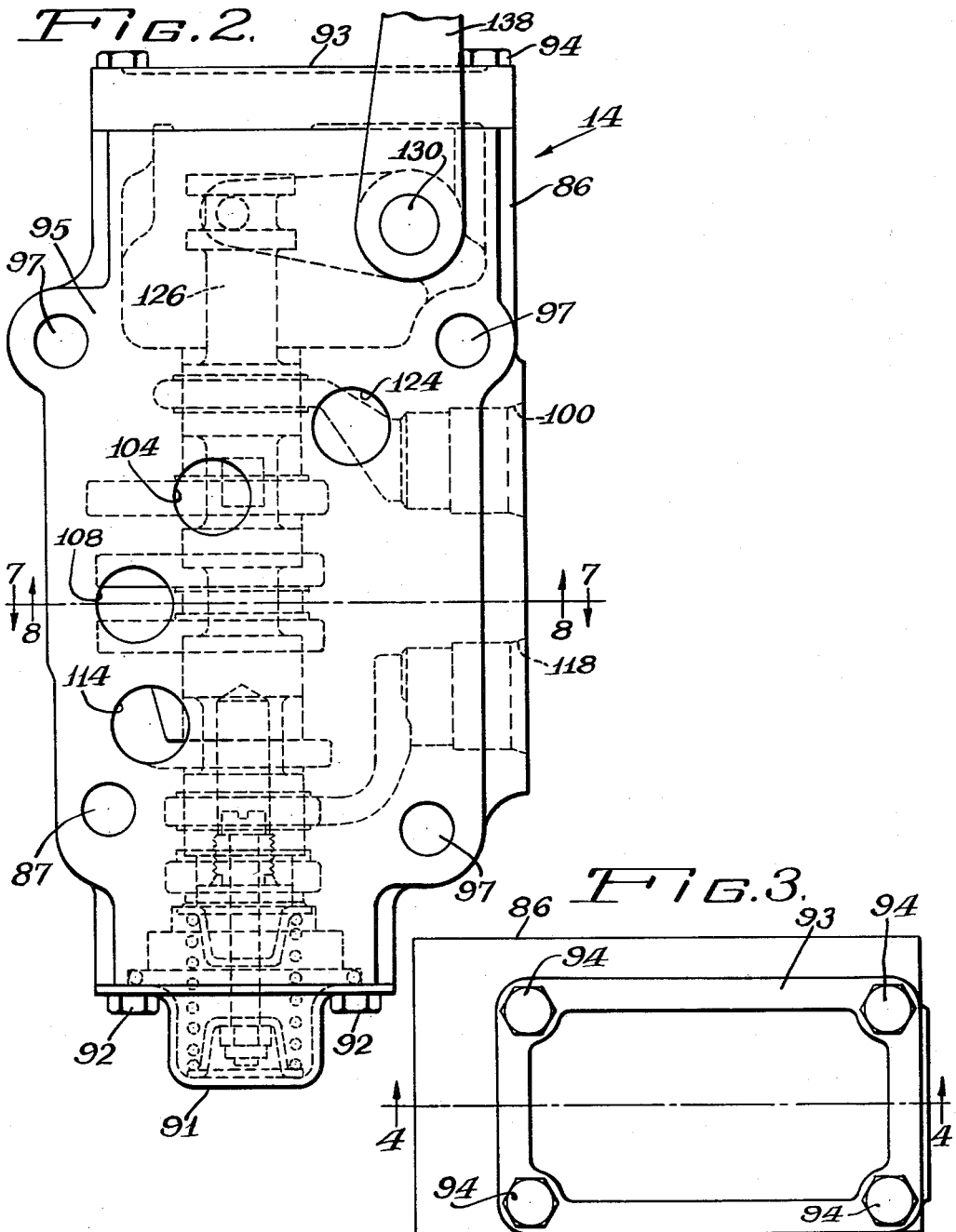

Inventor:
Donald W. Moyer
Atty.

June 7, 1960 D. W. MOYER 2,939,288
HYDRAULIC POWER TRANSMITTING MECHANISMS
Filed July 22, 1958 13 Sheets-Sheet 4

Inventor:
Donald W. Moyer
Paul O. Pippel
Atty.

June 7, 1960 D. W. MOYER 2,939,288
HYDRAULIC POWER TRANSMITTING MECHANISMS
Filed July 22, 1958 13 Sheets-Sheet 6
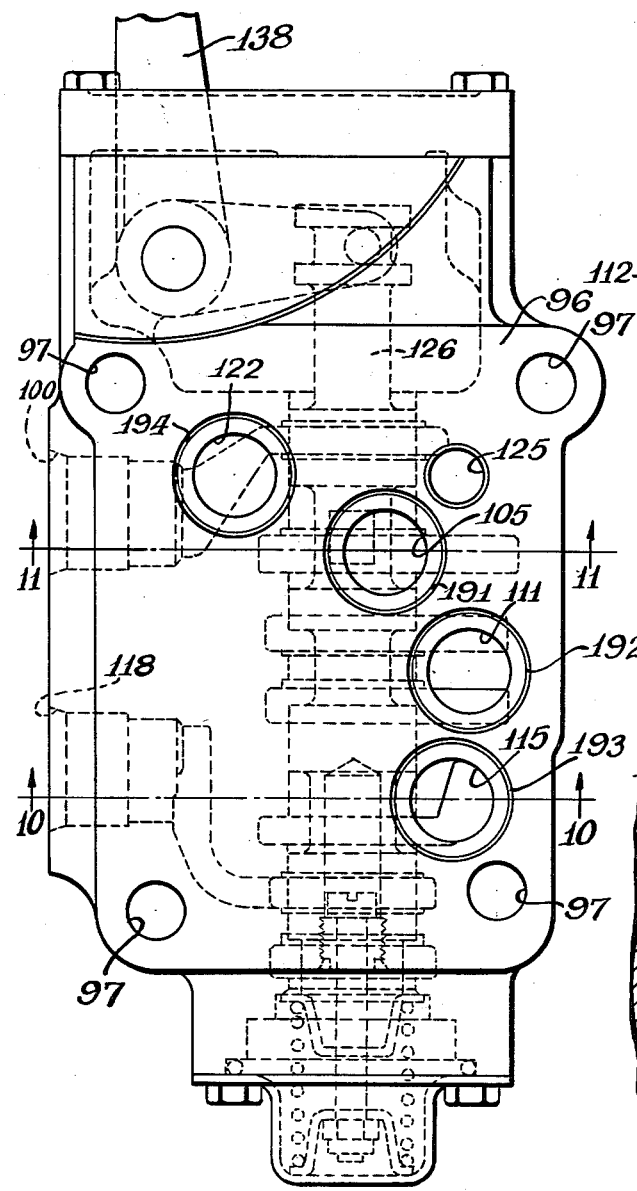
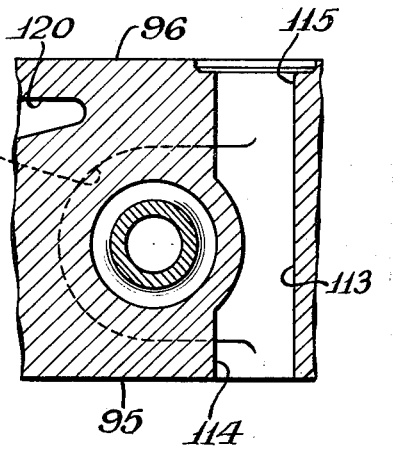
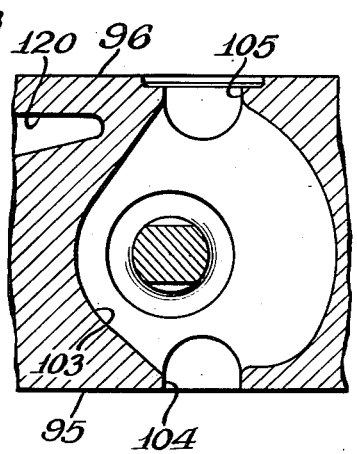
Inventor:
Donald W. Moyer
Paul O. Pippel
Atty.

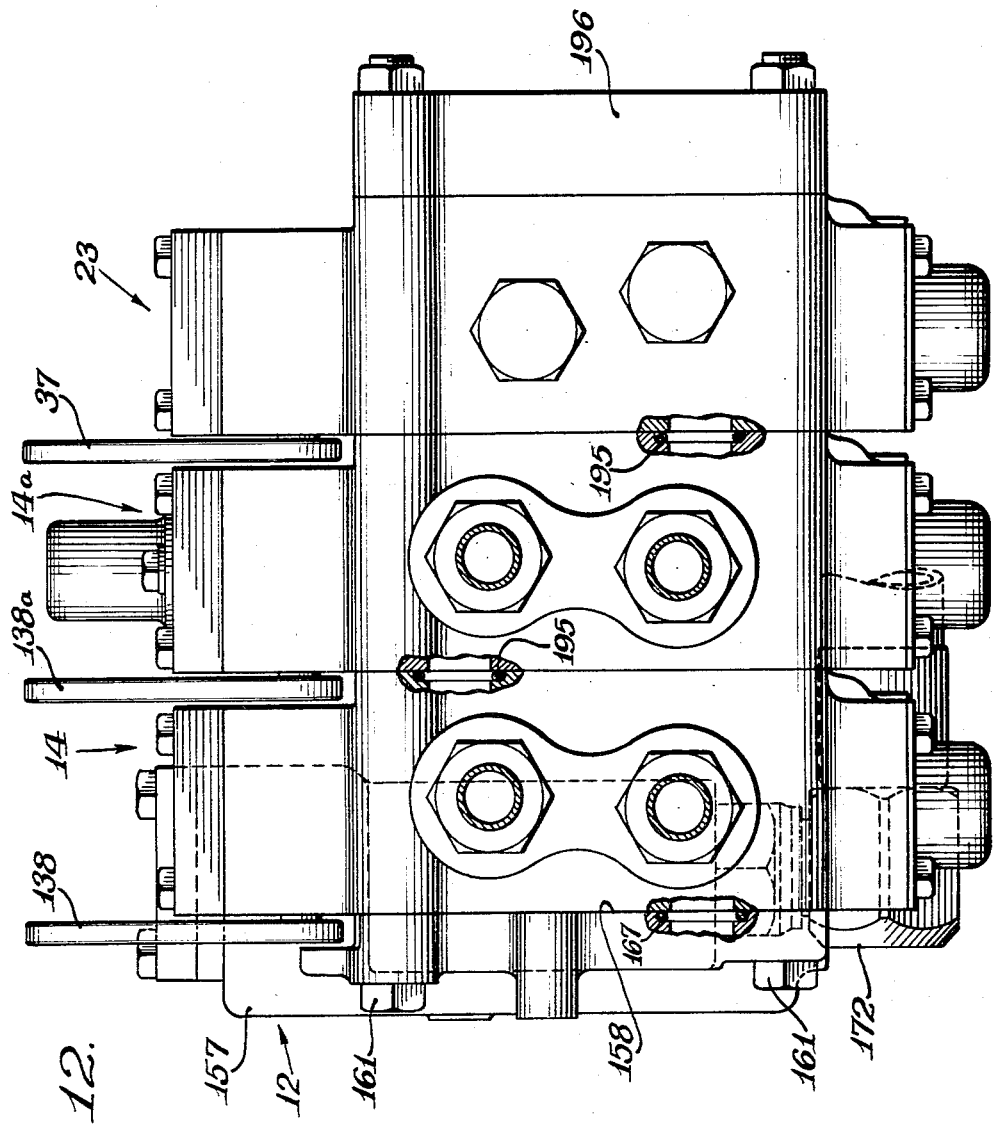

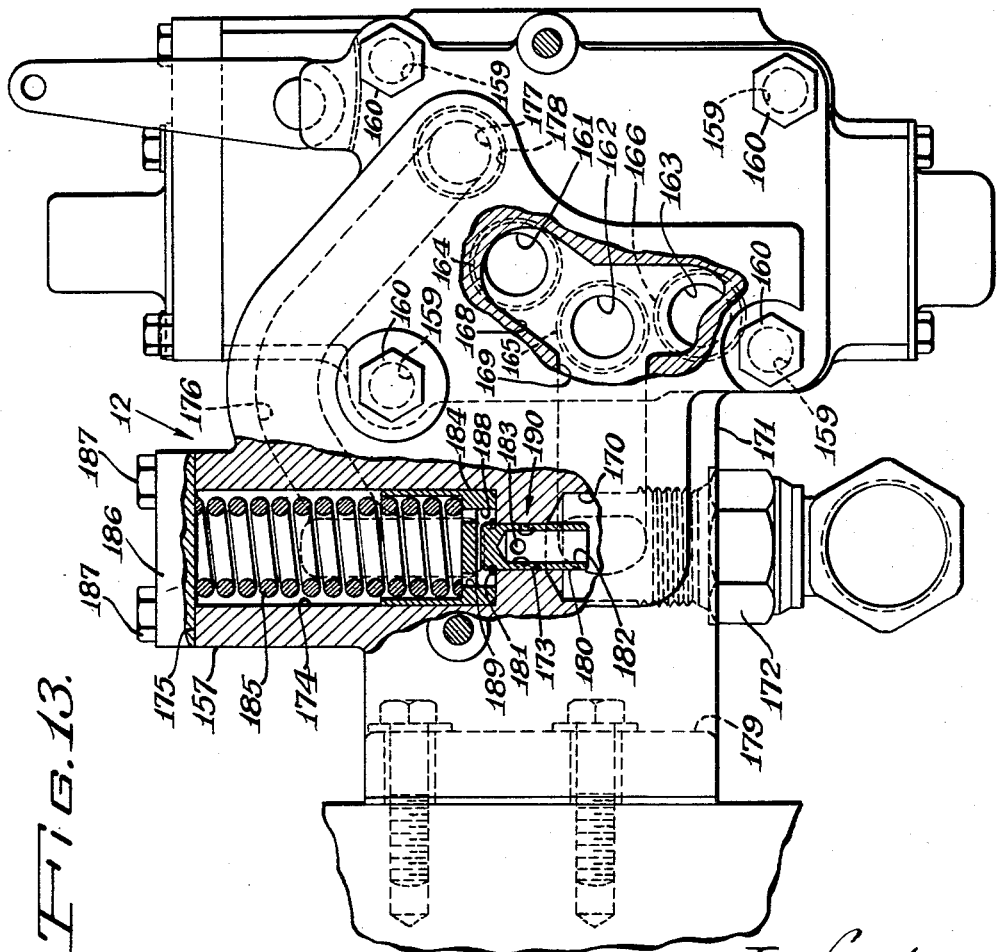

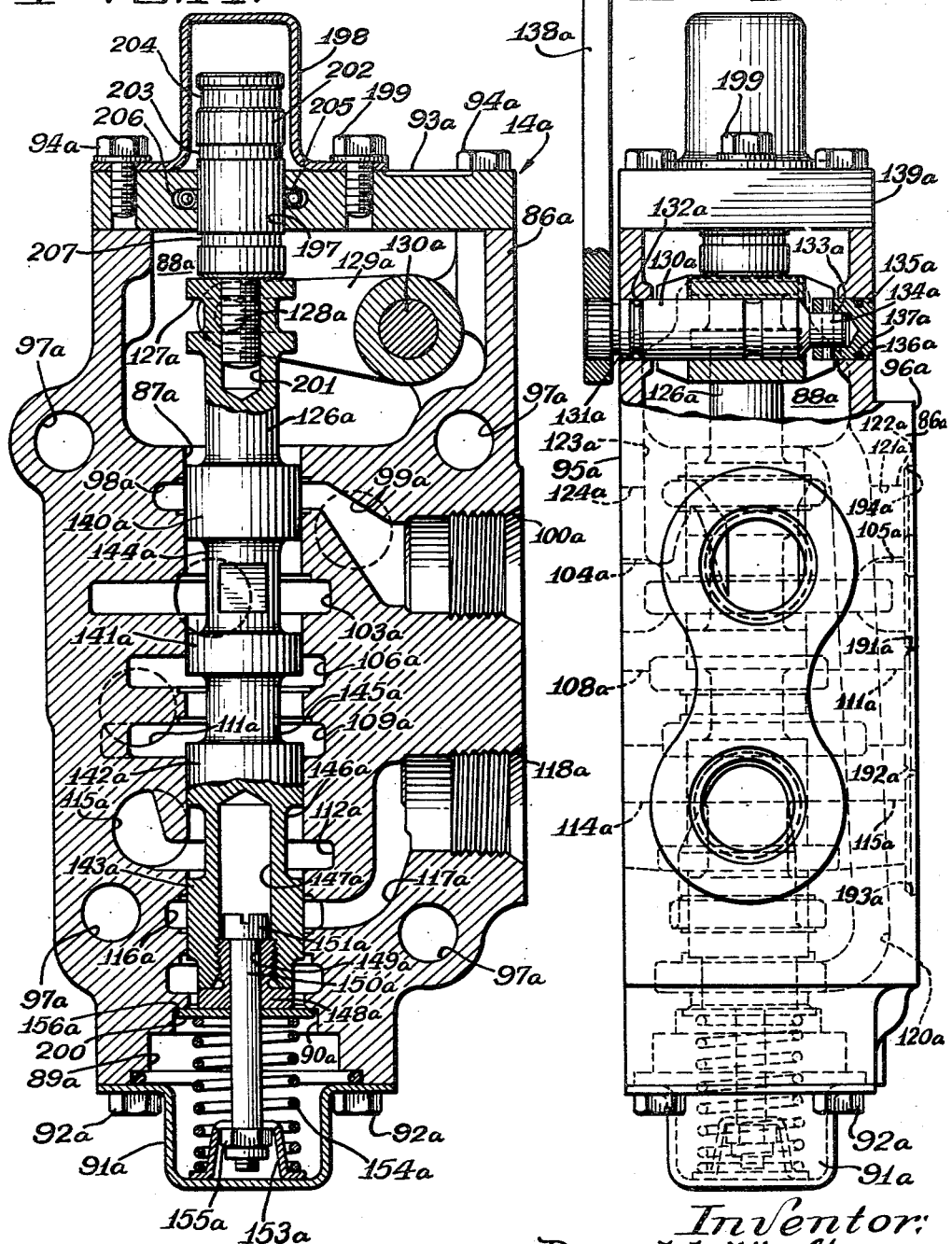

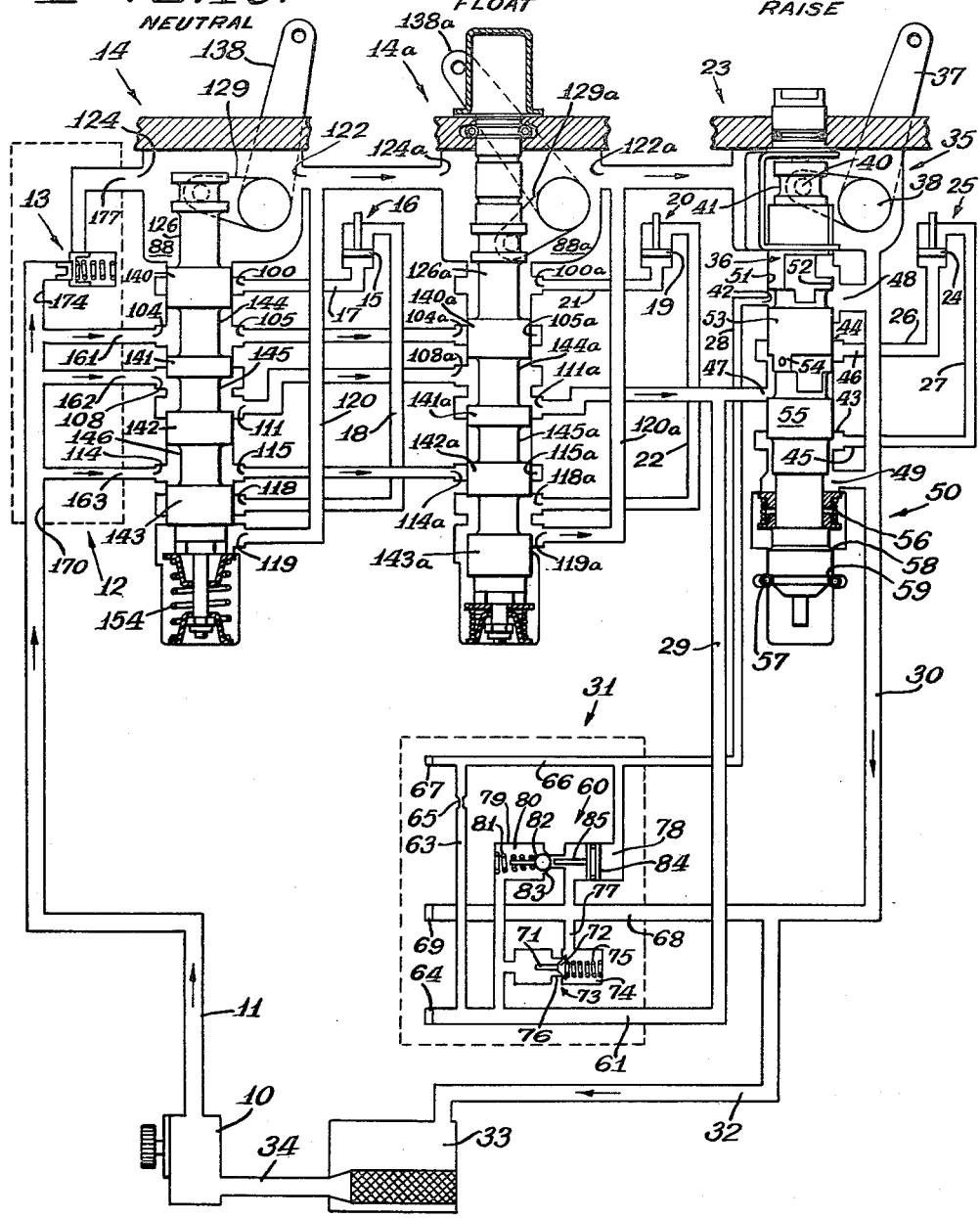

June 7, 1960 D. W. MOYER 2,939,288
HYDRAULIC POWER TRANSMITTING MECHANISMS
Filed July 22, 1958 13 Sheets-Sheet 11

Inventor:
Donald W. Moyer
Paul O. Pippel
Atty

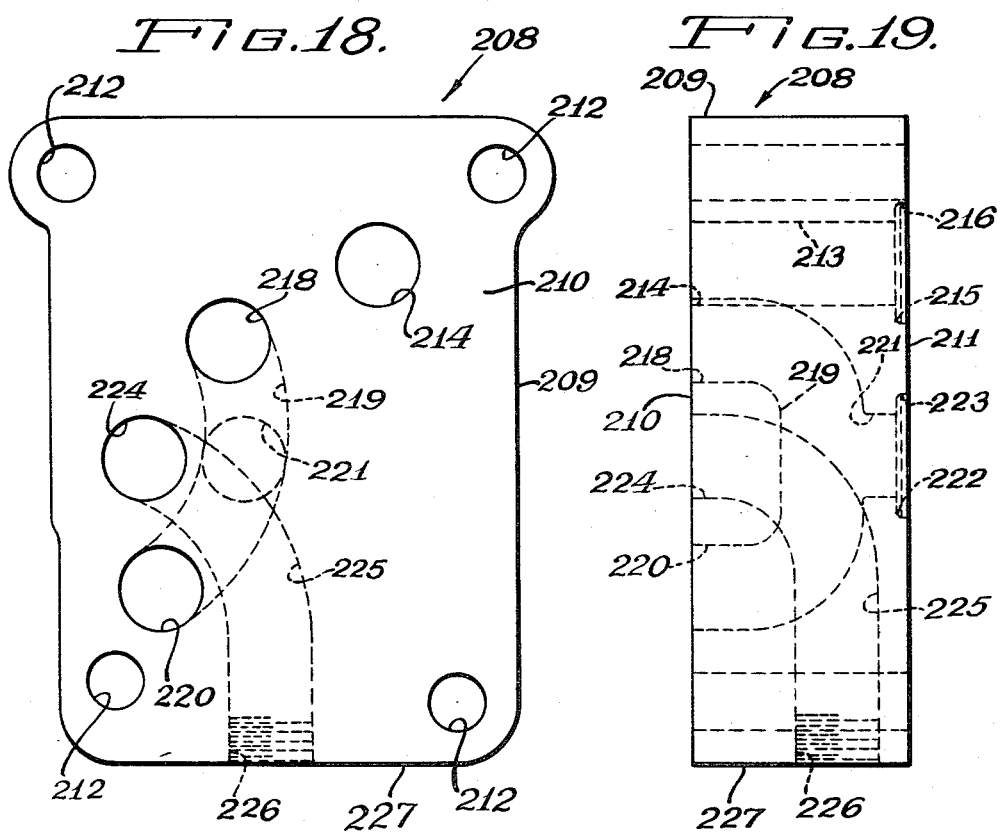

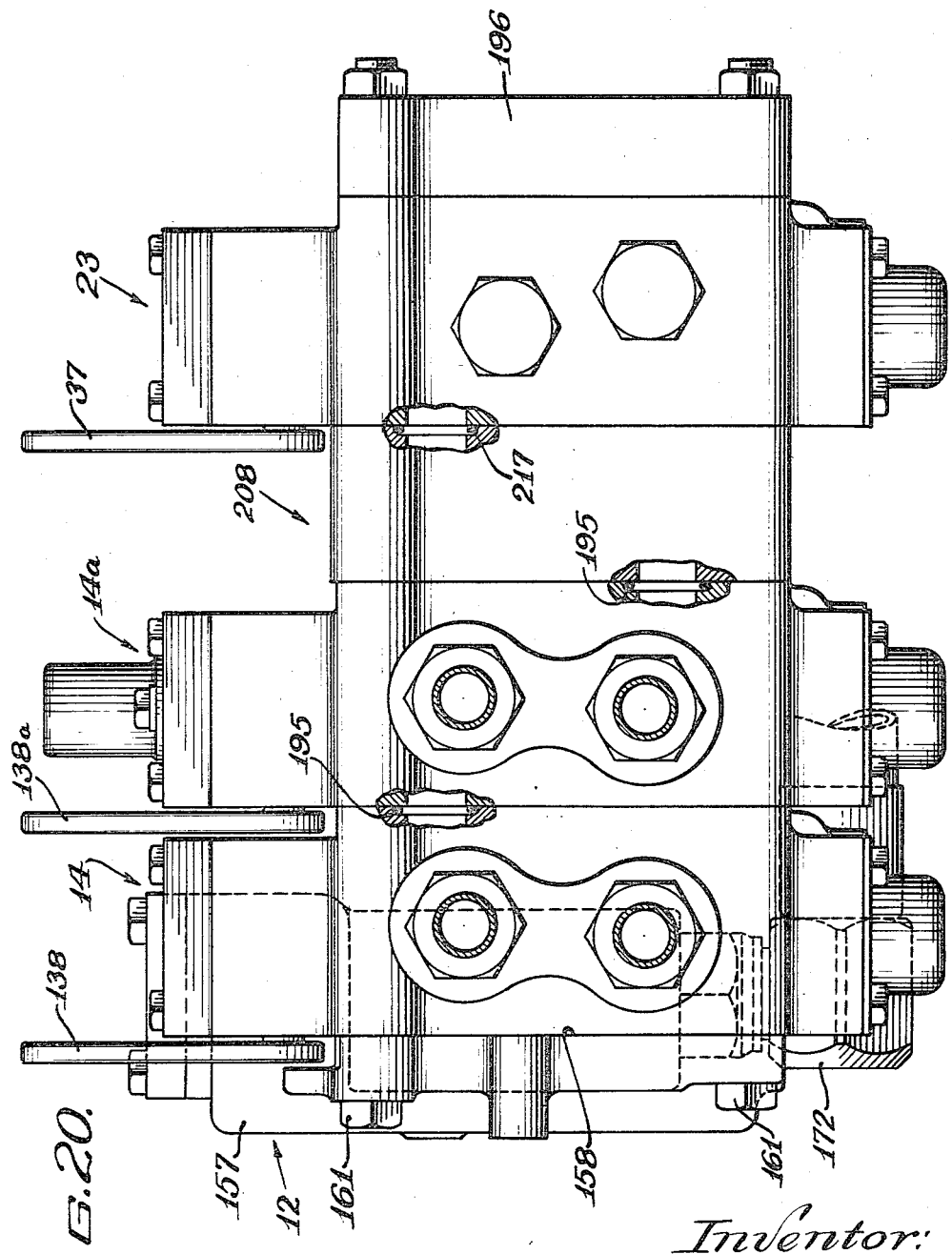

United States Patent Office 2,939,288
Patented June 7, 1960

2,939,288

HYDRAULIC POWER TRANSMITTING MECHANISMS

Donald W. Moyer, Chicago, Ill., assignor to International Harvester Company, Chicago, Ill., a corporation of New Jersey Filed July 22, 1958, Ser. No. 750,200

9 Claims. (Cl. 60—97)

This invention relates to hydraulic power transmitting mechanisms of the general type wherein a plurality of energy-translating devices are operated either individually or simultaneously, but more particularly it is concerned with a control valve adaptable for incorporation into an associated hydraulic system wherein the operation of one or more fluid motors may be controlled at will.

The invention is somewhat more specifically rleated to manually actuated control valves so fashioned and constructed that they may be operably arranged in banks and connected together in a variety of operational sequences for controlling a plurality of hydraulic motors from a single source of fluid pressure, such, for instance, as might be desired in the use of various types of road construction equipment, farm machinery, or other like applications.

The employment of hydraulic control valves in multiple banks has heretofore been proposed, and, as is well known, many forms of control valves adaptable for such use have previously been developed. In the past it was customary to use separate hydraulic control circuits, including separate pumps, for controlling the operation of various hydraulic motors associated with the equipment usually operated from a vehicle. Generally it was customary, too, to use one type of hydraulic system for the hydraulic motor that required the use of the position control or follow-up type valve, while another type system was employed for the hydraulic motors that did not require position control valves therein. This, of course, necessitated the use of a plurality of fluid pumps in order to provide individual sources of fluid pressure and, since the present trend has been to provide ever increasing amounts of different kinds of auxiliary hydraulic equipment, the continued employment of a separate pump for each individual system will quite naturally result in bringing about a condition where there will be an excess number of such pumps and systems carried by the vehicles used for such purposes.

An ideal or optimum condition would, of course, seem to suggest combining the different type systems so as to utilize the best features of each while minimizing the drawbacks and disadvantages inherent in each, and, at the same time, effectively permitting the use of only one source of fluid pressure. Heretofore, attempts have been made to provide valves that would permit combining different types of systems, but such previous efforts as have been directed thereto have not met with very favorable acceptance.

When a hydraulic motor performs a function that requires positioning control involving a follow-up type valve it has been the practise to use what is generally termed in the art a closed-center system, or one wherein the flow of pressure through the valve is under the control of a secondary valve. This system is particularly useful and advantageous in that it permits the use of a follow-up control valve of the type that accurately controls the positioning of the piston or operating member of an associated fluid motor merely by moving the control lever of said valve to a preselected position and then releasing the lever. It is also quite useful in that such a follow-up type valve may be used individually or in banks wherein a plurality of hydraulic devices are controlled thereby. On the other hand, an inherent characteristic of the closed-center type of system permits relatively high transient pressures to develop therein each time the control valve is operated or moved from one of its positions to another, and this, of course, represents an objectionable deterrent to the use thereof for controlling certain types of hydraulically actuated devices. Another characteristic of this type system, which may be deemed objectionable under certain conditions, is that fluid under pressure does not flow through the control valve itself for use downstream therefrom when said valve is in its neutral position. Furthermore, because of the use of a pressure regulator means in this type hydraulic system the parasitic losses may at times be appreciable. Nevertheless, the merits of this system commend it for use and, as a result, it has found substantial favor in the commercial markets for usage that requires positioning control. A control valve together with an associated control system which represents a modification of the conventional closed-center hydraulic system, and which has been well received in the industry, is exemplified by the U.S. Patent No. 2,836,195 to Ziskal, issued May 27, 1958 which provides a follow-up control valve of the type adaptable for use with a pilot regulator or pressure controlling means in a modified closed-center type of hydraulic system.

When a hydraulic motor to be controlled performs a function that does not require positioning control nor the use of a follow-up type of control valve it has been custmary to employ what is frequently termed in the art an open-center type system, or one wherein the flow of fluid pressure through the valve is under the control of the valve itself. This type system is particularly advantageous because it may be used without a pressure regulator and the parasitic losses incident thereto, and, additionally, since the rise and fall of pressures in the system are so much more gradual the transient pressures which ordinarily occur upon operation of a control valve from one position to another are eliminated, and concomitantly therewith there is provided a smoother and finer control for the hydraulic system. In this type of system, however, it was not always practicable and easy to operate the control valve in its neutral or float positions with very low by-pass pressures, nor was it readily feasible to independently operate the individual valves when arranged in banks because, without the additional parallel type of control circuits sometimes employed, there was no provision for effecting the flow of fluid pressure through one valve mechanism to a subsequent valve when the first valve was in its neutral position. Furthermore, this type system was not readily combined in any well known industrial use with the closed-center type of system so as to operate both systems simultaneously off a single or common source of fluid pressure in one installation.

Since the prior art has not heretofore provided a suitable means whereby a hydraulic control system having a pressure regulator therein could be satisfactorily connected to operate from a common source of fluid pressure with a control system that did not contain a pressure regulator therein, it is a feature of the present invention to overcome these shortcomings and to provide control valve means so fashioned as to permit the aforesaid hydraulic systems to be connected together to operate from a common source of fluid pressure, and further to permit the control valves in said systems to be operable either individually or in multiple banks to control one or more hydraulically actuated devices associated therewith.

A primary objective of the invention, also, is to provide a unique and improved hydraulic control valve of the type wherein fluid from a source of fluid pressure is movable through the mechanism of said valve to another hydraulic device downstream therefrom when said control valve is operably conditioned into either a neutral or a float position.

Another primary objective is to provide an improved hydraulic power transmitting means wherein hydraulic systems of different types are connectable together to operate from a common source of fluid pressure for independently controlling the operation of a plurality of hydraulically actuated devices.

An important object is to provide an improved hydraulic control valve adaptable for operation singly or in banks in a hydraulic circuit that does not utilize a pressure regulator device therein.

Another important object is to provide an improved hydraulic control valve of the type wherein one or more of such valves are connectable together for parallel operation in a type of open-center hydraulic system, and which system is adaptable for connection in series with one or more hydraulic control valves incorporated in a type of closed-center hydraulic system, each of said valves being operable to individually operate an associated hydraulically actuated device, and wherein the combined systems assembly is operable from a common source of fluid pressure.

A further important object is to provide a hydraulic control valve so fashioned that parallel or divided fluid pressure paths are provided therethrough to permit directing one fluid pressure stream from a source on the upstream side of the valve through the controlling mechanism of the valve to an hydraulically actuated device, while simultaneously another fluid pressure stream is directed through a portion of the valve mechanism to another hydraulic device on the downstream side thereof and said latter stream is unaffected when said valve is conditioned in its neutral or float positions.

Another object is provide an improved hydraulic control valve of the type adaptable for operation singly or in multiple banks in a hydraulic system with other control valves of a similar or dissimilar type and which improved valves are so fashioned that each of the valves in the system are individually operable regardless of the operating position of any of the other valves therein for controlling the operation of a respectively associated hydraulically actuated device.

The foregoing and other objects and features of the invention will become apparent as the disclosure is more fully made in the following detailed description of a preferred embodiment of the invention as illustrated in the accompanying sheets of drawings in which:

Figure 1 schematically illustrates the presently proposed species of hydraulic power transmitting apparatus;

Figure 2 is a front elevational view of a preferred form of the improved control valve incorporated in the proposed apparatus;

Figure 3 is a top plan of the control valve of Figure 2;

Figure 9 is a rear elevational view of the control valve shown in Figure 2;

Figure 10 is a fragmentary horizontal sectional view taken on line 10—10 of Figure 9;

Figure 11 is a fragmentary horizontal sectional view taken on line 11—11 of Figure 9;

Figure 12 is a side elevation view of a multiple bank of control valves including an inlet manifold tower on one end thereof, and having portions of the side walls of said components broken away to show details of construction;

Figure 13 is an end elevational view of the multiple bank of control valves shown in Figure 12, and having portions thereof broken away to show constructional details of the components;

Figure 14 is a vertical sectional view generally similar to Figure 4 but showing a modified form of the control valve illustrated in Figure 4;

Figure 15 is a side elevational view of a modified form of the control valve shown in Figure 14 and depicted with a portion thereof broken away to reveal details of the components thereof;

Figure 16 is a schematic view resembling Figure 1 but shown with the control valves thereof in a different sequence of operating positions;

Figure 18 is a front elevational view of the proposed adapter plate member;

Figure 19 is an end elevational view of the adapter illustrated in Figure 18; and Figure 20 is a side elevational view, generally similar to Figure 12, but showing the incorporation of an adapter plate with a multiple bank of control valves.

Figure 4:
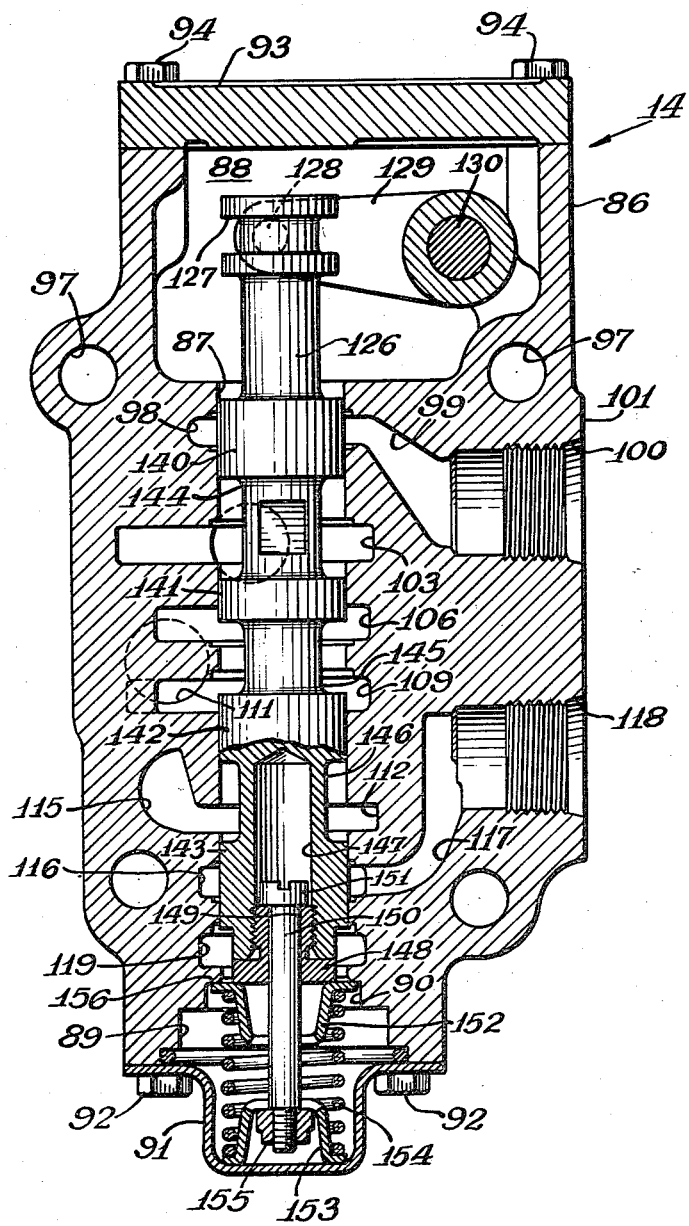
Figure 4 is a vertical sectional view taken on line 4—4 of Figure 3.
Figure 5:
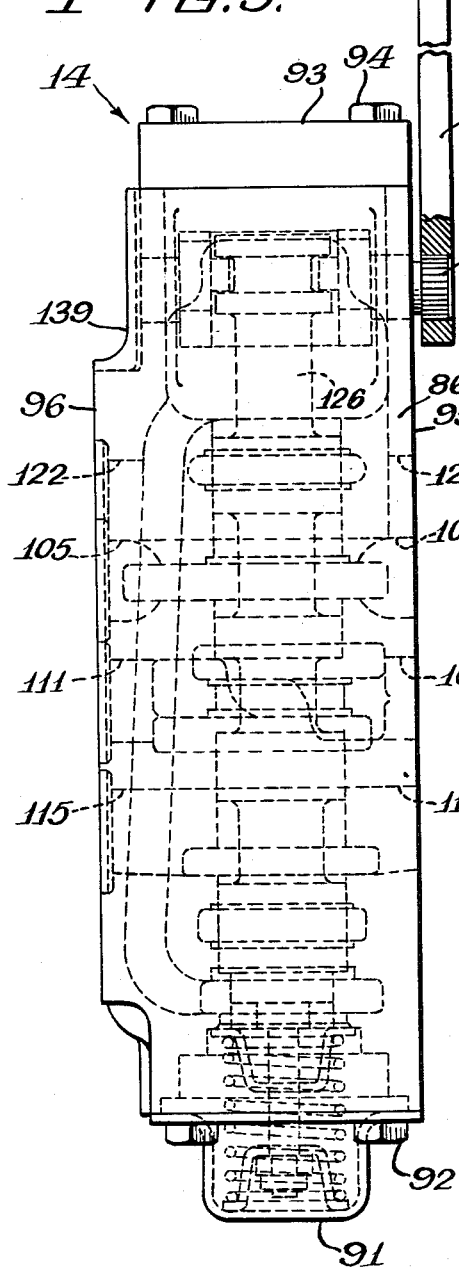
Figures 5 and 6 are opposite side elevational views of the control valve shown in Figure 2, with portions thereof shown broken away to reveal details of construction.
Figure 6:
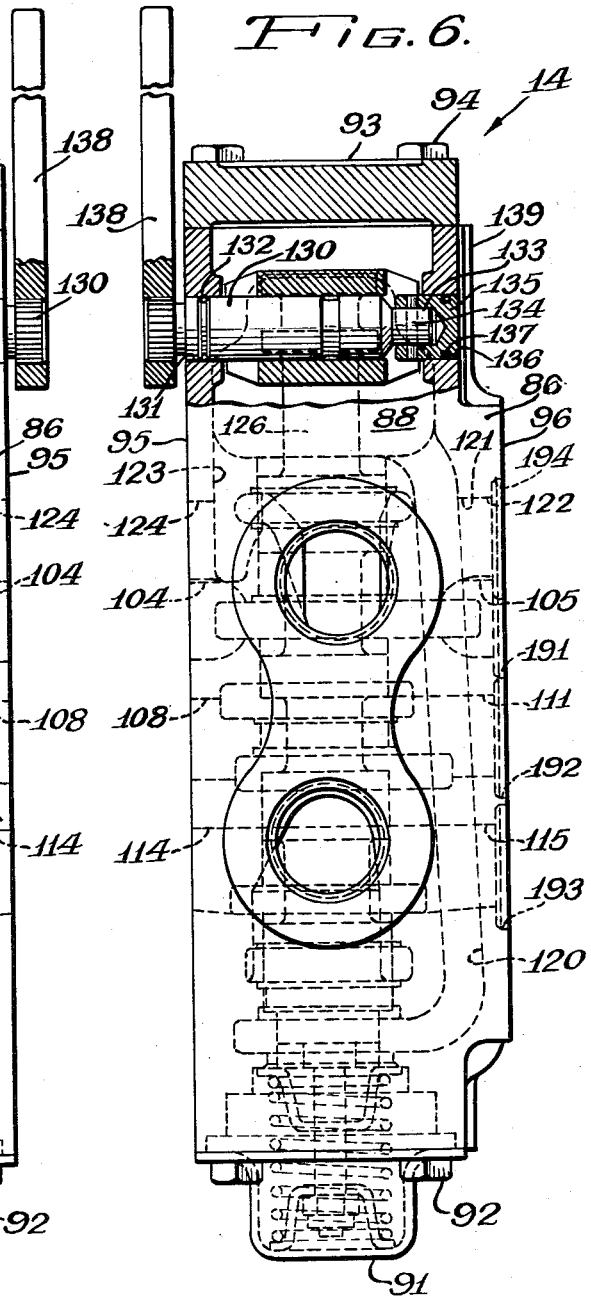
Figure 7:
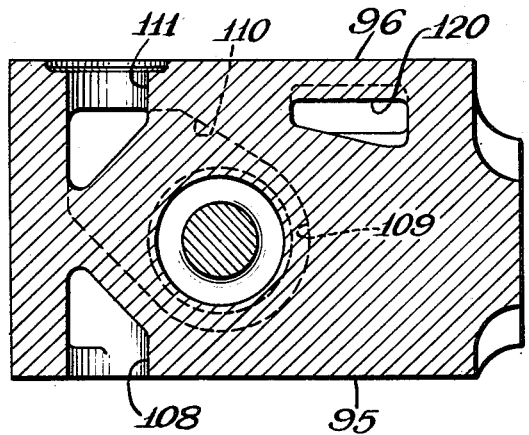
Figure 7 is a horizontal sectional view taken on line 7—7 of Figure 2.
Figure 8:
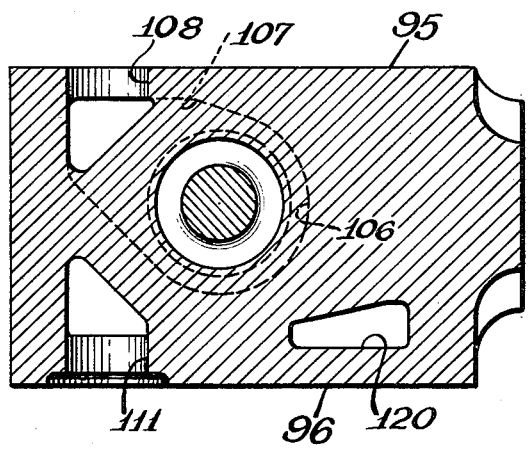
Figure 8 is a horizontal sectional view taken on line 8—8 of Figure 2.

In the accompanying drawings there is illustrated one preferred embodiment of the invention which has been shown in association with a plurality of hydraulic motors adaptable for operating respective hydraulically actuated devices which may take any one of many different forms but, for purposes of understanding the invention, it was felt further specific showings of such devices and the structural details thereof was unnecessary.

In Figure 1 there is shown a schematic representation of an hydraulic system or power transmitting apparatus incorporating a specific application of the teachings of the present invention therein. In this particular application two hydraulic control valves of a similar type are connected together in a parallel circuit and this circuit, in turn, is connected in series with a hydraulic control valve of a different type incorporated in a circuit utilizing a pressure regulator means, and the whole installation is supplied from a single source of fluid pressure.

A conventional fluid pressure pump of the type that provides a fixed displacement at fixed r.p.m.'s is represented generally by the reference numeral 10, it being understood, of course, that suitable means for driving the said pump will be provided in accordance with standard practice which, generally, takes the form of the engine on a vehicle wherein said pump may be mounted.

The outlet of said pump is connected by suitable conduit means 11 and a manifold tower 12, including a safety valve 13, to a first hydraulic control valve, indicated by the reference character 14, which operatively controls a double-acting piston 15 in a fluid motor 16 connected thereto by conduits 17 and 18, while a second hydraulic control valve 14a operatively controls a double-acting piston 19 in a fluid motor 20 connected to said latter valve by conduits 21 and 22, and a third control valve 23 operatively controls a double-acting piston 24 in a fluid motor 25 connected to said latter valve by conduits 26 and 27. The said first, second and third valves are operatively coupled together without the use of individual conduits, as will be further explained as the description proceeds.

The valve 23 is connected by a pressure regulating or control line conduit 28 and by fluid delivering and return conduits 29 and 30, respectively, to a pressure regulator means, indicated generally by the reference numeral 31, while a return line conduit 32 empties into a reservoir 33 which, in turn, is connected by a conduit 34 to the inlet of pump 10 to complete the fluid circuit through the hydraulic system illustrated.

Figure 17:
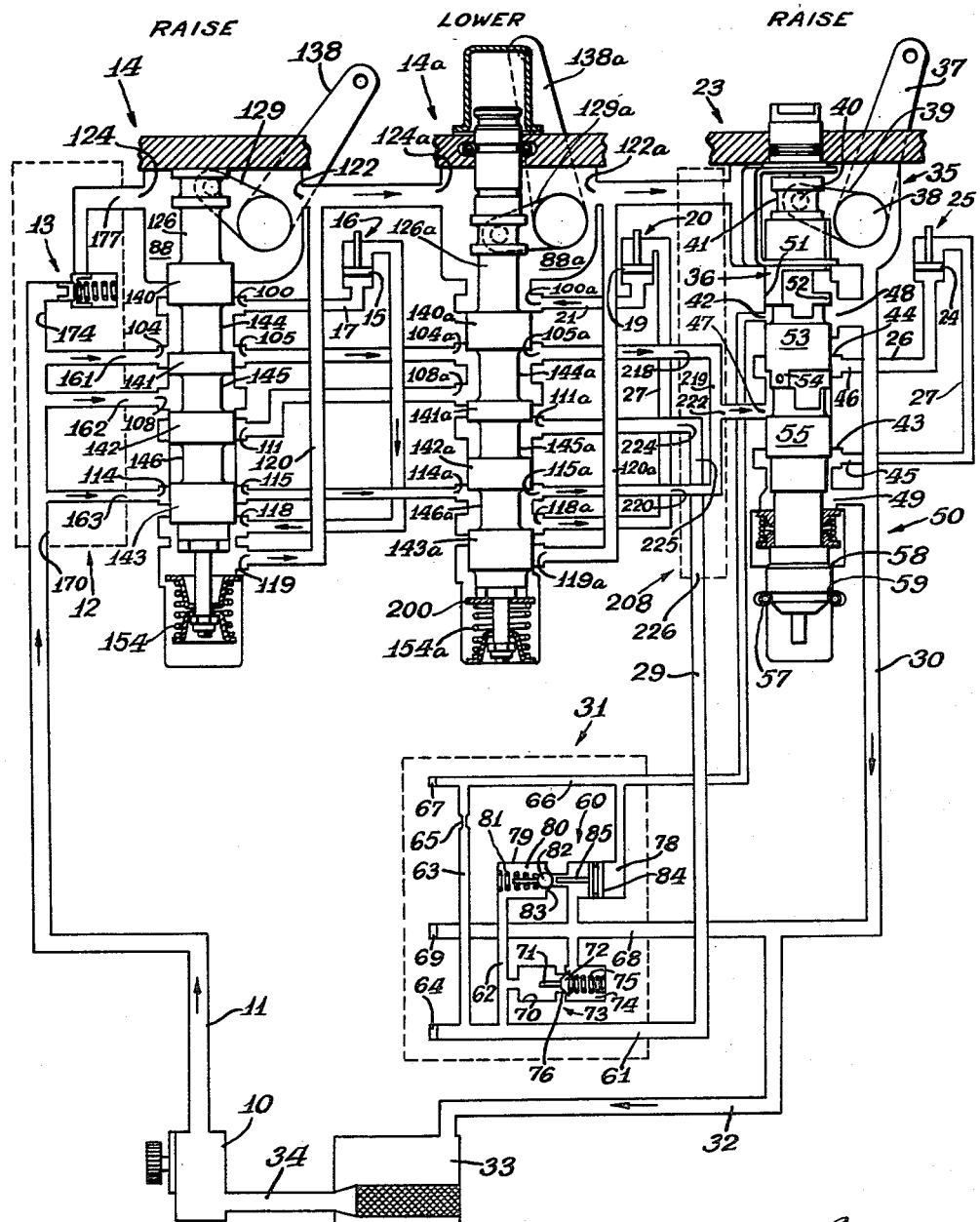
Figure 17 is a schematic view of the presently proposed species of hydraulic power transmitting apparatus illustrated in Figure 1, but including an additional adapter member disposed between the intermediate and final valve.

The valve 23, shown in Figures 1, 16 and 17 only in a schematic form, is the same control valve that is described and claimed in the Ziskal U.S. Patent No. 2,836,195, issued May 27, 1958, but since the structural details of the device are explained at length in that patent, and since the operation is the same in both instances, it was felt that repeating all such details herein would serve no useful purpose. Suffice it to say that a valve body casing indicated by the reference 35 is provided to slidably receive a valve spool or plunger 36 that may be moved axially by means of an operating arm 37 mounted on a shaft 38 and carrying a shifter fork 39 with a pin 40 therein for engaging a shifter groove 41 adjacent one end of said plunger.

A regulating or control passage port 42 in casing 35 is fashioned to communicate with the regulator conduit line 28, while reverse flow ports 43 and 44 communicate with reverse flow passages 45 and 46 that are connected, respectively, by conduits 26 and 27 with opposite ends of the cylinder of fluid motor 25. A fluid delivery or pressure port 47 communicates with the fluid delivery line 29 and, additionally, with a pressure or fluid delivering port of an adjoining valve as will be more fully understood as the description proceeds. The exhaust or return flow ports 48 and 49 communicate with exhaust passage means 50 formed in the valve casing and this, in turn, connects with the return flow line or conduit 30.

The valve spool or plunger 36 is fashioned with control port masking lands 51 and 52 while axially spaced therefrom is a land 53 having diametrically opposite fluid delivery port masking lands 54 thereon and spaced axially from the latter is a cylindrical land 55. A helical spring 56 serves to normally maintain the spool of said valve in its centered or neutral position, while a contracting garter spring 57 cooperates with the axially spaced annular shoulders 58 and 59 to provide detent means for holding said valve spool in various axially displaced operating positions.

The pressure controlling or regulating unit 31, shown only in schematic form in Figures 1, 16 and 17, is identical with the unit shown and described in the Ziskal U.S. Patent No. 2,836,195, while the blocking valve controlling device portion 60 thereof is further described and claimed in U.S. Patent No. 2,625,177, and, since further details of the structural features are contained in these patents, it was felt unnecessary to repeat all of such descriptions herein. The pressure or fluid delivery line 29 communicates with a fluid delivery passage 61 in the regulator which, in turn, communicates with a by-pass passage 62 and with a passage 63 while the opposite end or port of said fluid delivery passage may be closed with a plug such as indicated at 64. A throttling orifice 65 in passage 63 opens into a control passage 66, and one end or control port of said passage is closed by a plug indicated at 67 while the opposite end or control port thereof communicates with regulator line 28. Exhaust passage means 50, of control valve 23, communicates with an exhaust passage 68 in the regulator and the opposite end or port of said latter passage is closed by a plug such as indicated at 69.

The by-pass passage 62 communicates with one end of an enlarged bore opening 70 which accommodates the stem 71 of a poppet valve head 72 constituting a pressure relief or safety valve 73, which head extends into a spring chamber 74 formed as an extension of the bore 70. A spring 75 normally urges the valve head 72 into seating relation against a narrowed shoulder portion 76, of the bore 70, so as to close off communication between the chamber 74 and the by-pass passage 62. Chamber 74 communicates by way of a passage 77 with exhaust passage 68 and with a control chamber 78 formed as part of the blocking valve controlling device indicated at 60. One end of chamber 78 communicates with control passage 66 while the opposite end of said chamber communicates with a blocking valve 79 having a chamber 80 therein which receives a spring 81 that urges a ball 82 against a ball seat 83 and, in turn, communicates with by-pass passage 62. A plunger 84 having a tubular stem 85 thereon is slidably mounted in the control chamber 78 and upon movement may engage the ball 82 to displace it from its seat 83.

When the valve 23 is in its neutral position, such as shown in Figure 1, the control port masking land 51, of the plunger 36 therein, closes off the control port 42 and fluid in the regulator or control line 28 is trapped and unable to flow. So long as fluid cannot escape from the control passage 66 the unit pressure on the one end of controlling device plunger 84 will be the same as the unit pressure on the far side of the valve ball 82. Since the area of the one end of plunger 84 exceeds the area of ball 82 a unit pressure acting upon the same end of said plunger equal to that acting upon the far side of the ball 82 will prevail over the total force of pressure fluid upon the ball 82 and the force of the spring 81 for unseating the ball 82, even though the unit pressure of the fluid is a nominal pressure at which the fluid is by-passed through the opened blocking valve 79 from the by-pass passage 62 to the exhaust passage 68.

So long as the blocking valve 79 is open fluid cannot be delivered by the pump 10 at a pressure adequate for operating the fluid motor 25. Closing of said blocking valve may be accomplished by allowing fluid to escape from the downstream portion of the passage 63 through either the control passage 66 and line 28, or through the port covered by plug 67, but is best done by moving the valve 23 from its neutral to either operating position. When fluid is thus allowed to escape from the passage 63 this drains off fluid from the control chamber 78 more rapidly than fluid can be supplied through the throttling orifice 65 which divides the upstream and downstream portions of the control passage 63. Consequently the unit pressure on the one end of the plunger 84 will be less than the unit pressure on the far side of the blocking valve ball 82 whereupon the spring 81 will be effective for closing the blocking valve 79. With this blocking valve closed fluid pressure then becomes available to operate the fluid motor 25, as desired, upon actuation of the valve 23.

In the event of excessive fluid pressure developing in the fluid delivery passage 61 and the by-pass passage 62, this pressure acting upon the outer end of the stem 71 and the end of the head 72 will move these parts against the pressure of the spring 75 so that the head 72 will unseat and allow fluid to escape through the pressure relief means 73 by way of chamber 74 and passage 77 into the exhaust passage 68 for return to the reservoir 33.

Now in accordance with the more specific features hereof the control valve that exemplifies the teachings of the present invention, and as shown in Figures 2–12 inclusive, is fashioned with a casing or body portion 86 having a cylindrical bore 87 therethrough. A hollowed-out portion at one end of said body provides an end chamber, such as indicated at 88, while at the opposite end co-extensive enlarged bore portions 89 and 90 are provided. A generally cup-shaped cover member 91 may be detachably secured to one end of the casing by suitable securing means, such as the cap screws 92, while at the opposite end and adjoining chamber 88 said casing is covered with a plate-like covering member 93 detachably secured thereto by cap screws 94. The front or obverse face 95 of the body 86 is substantially flat with no protrusions thereon as is, likewise, the back or reverse face 96 which is parallel thereto. A plurality of four peripherally spaced openings 97 extending through said valve body between front and back faces thereof are provided to receive tie bolts for securing two or more of such valves together in a banked relationship as will subsequently be understood.

The bore 87 has formed therein and disposed in axially spaced relationship therealong a plurality of seven annular recesses which provide portions of fluid flow passage means therethrough. One such annular recess 98, which is slightly spaced from the chamber 88, communicates with an angularly disposed passage 99 that opens into a work port opening 100 formed in a side face 101 of the body 86. A second annular recess 103, axially spaced from the first recess and somewhat bulbous-shaped in plan view (see Figure 11), communicates with an inlet or pressure port opening 104 in the front face 95 and with an aligned outlet or fluid delivery port 105 opening in the back face 96 of the casing. A third annular recess 106 (Figure 8), spaced from the second recess 103, communicates by means of a converging and generally flat passage 107 with an inlet or pressure port 108 opening in the front face 95 of the casing. A fourth annular recess 109 (Figure 7), slightly spaced axially from said third recess, communicates by way of a generally flat and converging passage 110 with an inlet or fluid delivery port 111 opening in the back face 96 of the casing. A fifth annular recess 112, spaced axially from said fourth recess, communicates with a transverse passage 113 (Figure 10), extending between an inlet or pressure port 114 opening in the front face 95 and a fluid delivery or outlet port 115 opening in the back face 96 of said casing. A sixth annular recess 116, spaced axially from said fifth recess, communicates with a generally L-shaped passage 117 that opens into a second work port 118 opening into the side face 101 of said valve body. The seventh annular recess 119, which is disposed proximate one end of the bore 87 and axially spaced slightly from said sixth recess, communicates with a passage 120 (Figure 6) that extends longitudinally of the casing 86 and at its opposite end opens into the chamber 88. A lateral passage 121 connects the longitudinal passage 120 with a return flow outlet port 122 opening in the back face 96 of said casing, while the chamber 88 also communicates by way of a short passage 123 with a return flow inlet port 124 opening in the front face 95 of the casing, the latter port being in general alignment with the port 122 in the back face 96 thereof.

A counterbore or recess 125 in the back face 96 of said casing (Figure 9) is disposed for alignment with one end opening of the regulator or control passage port 42 of valve 23 so that one end of said control passage may be closed when certain ones of the adjoining valve faces are juxtaposed as will be later explained.

A valve spool or plunger 126, disposed for slidable axial movement within the bore 87, is provided with a shifter groove 127 at one end thereof that receives a pair of pins 128, only one of which is shown, affixed to one end of a shifter fork 129 the opposite end of which is fixedly mounted on a shaft 130 for rotation therewith. The shaft 130 is journalled in an opening 131 (Figure 6) in the front face 95 of the body 86 and a liquid seal 132 is provided therefor, while the opposite end of said shaft has a reduced section portion 133 thereon and is securely mounted by a pin 134 in a bearing member 135 that is journalled in an opening 136 in the back face 96 of said valve body with a conventional liquid seal 137 serving to seal said bearing member. An operating arm 138 mounted on a portion of the shaft 130 extending outwardly beyond the front face 95 of the casing 86, is provided to actuate the valve, as is well understood. The back or reverse face 96 of casing 86 has a portion adjacent said operating arm shaft cut-away as indicated at 139 to provide a recess for accommodating the projecting portion of said arm so that when such valve is positioned closely adjacent another valve there will be no physical interference with the operation thereof.

The spool or plunger 126 is further fashioned with a plurality of four lands 140, 141, 142 and 143 axially spaced therealong with the annular grooves 144, 145 and 146, respectively, disposed therebetween. Extending axilly inwardly, from the end of the spool opposite that containing the shifter groove 127, is a recess 147, the outer end portion of which is provided with screw threads for threadably receiving a plug-like bearing member 148. An axial opening 149 through said bearing plug is provided to slidably accommodate a bolt 150 the head 151 of which abuts the inner surface of said plug while the shank thereof projects through said opening and through a pair of generally cup or bonnet-shaped axially spaced brackets 152 and 153 having a coil spring 154 reactively disposed therebetween. A nut 155 threadably secured to the end of bolt 150 serves as part of an abutment for the bracket 153 and thus provides a means to assist in limiting axial displacement thereof.

With the valve in neutral the spool is centered as shown and the brackets 152 and 153 are axially displaced from one another a maximum distance, with bracket 153 abutting the end cover member 91 while bracket 152 abuts a shoulder 156 in the enlarged bore portion 90. When the shifter fork 129 is actuated to move the valve plunger upwardly, as viewed in the drawings, the bearing plug 148 is forced against the head 151 of bolt 150 thereby urging said bolt to follow the movement of said plunger and causing the bracket 153 to be moved inwardly and to compress the spring 154 against bracket 152 which, in turn, is tightly and immovably pressed against the shoulder 156; hence when the moving or urging force is removed from the operating arm 138 the compressed spring 154 will react to return plunger 126 to its centered or neutral position. Now when the shifter fork 129 is actuated to urge the plunger downwardly, as viewed in the drawings, the head and shank of the bolt 150 slide further into the axial recess 147 while the bearing plug 148 pressing against bracket 152 causes it to slide in the enlarged bore 90 and to compress the spring 154 and when the operating arm force is removed said plunger will again return to its centered or neutral position.

In order to provide suitable means for connecting the multiple pressure inlet ports on the front face 95 of valve casing 86 to the source of fluid pressure there is provided a manifold tower or column means, indicated generally by the reference numeral 12 (Figure 13), which is formed from a head-like member 137 having the reverse or back face 158 (Figure 12) thereof smoothly finished and flat so as to closely engage the front face 95 of a valve casing when positioned thereagainst, and having a plurality of tie-bolt openings 159 therein dipsosed for alignment with the respective openings 97 in said valve casing so that the bolts, such as 160, may be inserted therethrough to secure the manifold to the control valve unit. Fluid delivery or outlet ports 161, 162 and 163 opening in the reverse face of said manifold head are provided with counterbores 164, 165 and 166 each of which is adapted to receive an O-ring, such as shown at 167 (Figure 12), which provides a suitable liquid seal about each port when aligned with respective pressure ports in an adjacent valve unit. The ports 161, 162 and 163 communicate with an angularly extending passage 168, in the head 157, and this communicates with one end of a transverse passage 169 the opposite end of which opens into a cylindrical chamber 170 extending inwardly from one edge portion 171 of said head. A coupling 172 suitably mounted in the open end of chamber 170 serves to connect the inlet conduit 11 from the pump 10 into said manifold. The inner end of chamber 170 communicates by way of a somewhat smaller diameter passage 173 with a safety valve chamber 174 aligned with the chamber 170 and extending inwardly from another edge portion 175 of the head 157. The safety valve chamber 174 communicates by way of an angularly extending passage 176 with a return port 177 opening in the back face 158 of said head, while a counterbore 178 in said port receives an O-ring, such as shown at 167 for port 163, for liquid sealing purposes similarly to the other ports therein. An angularly extending bracket 179 affixed to said head may be used for mountably supporting the said manifold tower and its attached control valve units on a vehicle or any other structure with which the hydraulic system may be utilized.

Extending into cylindrical chamber 174 and slidably disposed in the interconnecting passage 173 is a safety or relief valve stem or plunger 180 having a split ring 181 on one end thereof that supports said plunger on the inner edge surface of safety valve chamber 174. The plunger 180 is hollowed out to provide an interior axial recess 182 and a plurality of peripherally spaced and staggered openings 183 in the wall of the plunger provide fluid communicating means therethrough. Positioned in the chamber 174 is a cup member 184 that receives one end of a coil spring 185 the opposite end of which abuts a cover plate 186 affixed over the open end of said chamber by suitable screw means 187. The spring cup 184 has a portion of the bottom thereof hollowed out, as shown at 188, to accommodate one end of the plunger 180 while a plurality of openings 189 in the bottom of said cup provide fluid communication means therethrough. When the fluid pressure in chamber 170 becomes excessive it reacts against the interior of axial recess 182, in plunger 180, causing the plunger to slide along passage 173 and engage the bottom of spring cup 184 which is thereby moved against the reactive force of spring 185. As soon as plunger 180 has moved sufficiently to position one of the staggered openings 183 therein above the bottom edge of chamber 174 fluid becomes free to escape through said opening into the hollowed out portion 188 in the cup 184 and then through the openings 189 therein into the safety valve chamber 174, which, being in communication with the return fluid passage 176, relieves the excessive pressure in the system. A further rise in pressure would, of course, cause greater compression of the spring 185 and thus permit even greater relief of pressure in chamber 174 by way of return passage 176. When the pressure subsides to normal the spring 185 will react to restore the safety valve, indicated generally by the reference numeral 190, to its original position, in which there is substantially no interchange of fluid between the cylindrical chamber 170 and the relief valve chamber 174.

The fluid delivery ports 105, 111 and 115 and the return flow port 122 on the reverse or back face of the valve casing 86 are each formed with a counterbore, such as shown at 191, 192, 193 and 194, that is adapted to accommodate an O-ring type of liquid seal, such as indicated at 195 (Figure 12). When it is desired to use two or more of such valve units in a multiple or banked relation, the reverse or back face of the first valve is positioned against the smooth obverse or front face side of the next succeeding valve with the fluid delivery outlet ports of the upstream valve in register with the pressure inlet ports of the downstream valve, and with the individual O-ring seals providing suitable fluid seal means between the respectively aligned ports, while the long-shank tie-bolts 160 function to tightly couple the valves together in a liquid tight relationship. The counterbore 125 in the reverse face of valve casing 86 is disposed in alignment with the control or regulator passage port 42 of valve 23. As fashioned this control passage extends from front to back through the body of valve 23 and the control conduit line 28 communicates with a portion of the passage other than the ends thereof as would appear from the schematic representation of Figures 1, 16 and 17, while the port ends of said passage are in communication with adjoining valves. Since the adjoining valve in this instance is of the type that does not require the regulator or control feature for its operation, the adjoining port passage may be closed by an O-ring disposed in the respective registering counterbore.

When a modified type of open-center valve, such as is illustrated by the reference numerals 14 or 14a, is coupled for operation to a modified type of closed-center valve, of the type schematically represented by the reference numeral 23 in Figures 1, 16 and 17, only one of the fluid delivery outlet ports of the open-center type valve is connected to a pressure inlet port of the closed-center type valve 23 and the unused ports are sealed off by O-rings, such as illustrated at 195 or 195a (Figure 12), disposed in abutting relation with the blank wall of the latter valve unit. In the event the proposed valve is to be employed individually without other control valves in the downstream side of an hydraulic system, none of the fluid delivery outlet ports ordinarily used for delivery of fluid to subsequent valves need be used to deliver fluid and hence all such ports may be sealed-off by suitable cover-plate means, such, for instance, as the cover-plate indicated at 196 for covering the reverse face of the final valve in the series.

In Figures 14 and 15 there is depicted a modified form of the proposed improved valve while Figures 1, 16 and 17 schematically illustrate the employment of the modified valve in a combination hydraulic system. For purposes of simplicity, like elements have been designated with the same reference characters, plus the addition of the suffix "a" thereto, as was used in describing the first preferred form of the improved valve unit.

The modified valve unit is designed to provide an additional valve operating position, that of "float," whereby the piston of the fluid motor associated therewith is floatably movable without operating the valve spool mechanism. Such a position is desirable, as is well understood, for certain types of hydraulically actuated equipment but may be objectionable in other instances, hence the proposed valve of the present invention is constructed so as to be readily adaptable for changing from one form to the other with a minimum of effort and expense.

In its modified form the valve unit comprises a casing 86a having a cylindrical bore 87a and a hollow chamber 88a at one end, and enlarged bores 89a and 90a at the opposite end. A cup-shaped cover 91a is detachably affixed at one end by the screws 92a, and the opposite end is covered with a plate-like member 93a having an opening 197 therein and is secured by screws 94a, while an additional protective bonnet member 198 is secured over the opening 197 to said cover-plate by the screws indicated at 199. The front face 95a and back face 96a of said casing are smoothly finished and disposed parallel to one another, while a plurality of openings 97a provide for receiving suitable fastening bolts.

The bore 87a has, as in the first preferred form of the valve, seven annular recesses, the first of which indicated 98a, communicates by way of passage 99a with the work port 100a, the second recess, indicated 103a, communicates with inlet port 104a and aligned outlet port 105a, the third recess 106a communicates with inlet port 108a, the fourth recess 109a communicates with outlet port 111a, the fifth recess 112a communicates with the inlet port 114a and outlet port 115a, the sixth recess 116a communicates by way of passage 117a with work port 118a, and the seventh recess 119a communicates by way of passages 120a and 121a with the end chamber 88a and with return flow outlet port 122a, respectively, and by way of passage 123a with the return flow inlet port 124a.

A valve spool or plunger 126a has a shifter groove 127a on one end thereof that receives a pin 128a affixed to shifter fork 129a, in turn, mounted on shaft 130a. Shaft 130a is journalled in opening 131a and fitted with liquid seal 132a, and a reduced section portion 133a on said shaft is mounted by a pin 134a in bearing member 135a journalled in opening 136a and provided with a conventional liquid seal 137a therearound. An operating arm 138a on shaft 130a extends outwardly beyond the front face of the casing, while the reverse face 96a of said casing has a cutaway or recessed portion 139a therein for accommodating the operating arm extension of an adjacently disposed valve.

The spool 126a is fashioned with lands 140a, 141a, 142a and 143a having annular grooves 144a, 145a and 146a therebetween, while an axial recess 147a therein threadably receives a plug-like bearing member 148a having an opening 149a therethrough which slidably accommodates the shank of a bolt 150a the head 151a of which abuts the inner surface of said bearing member. The shank of said bolt projects through a generally cup or bonnet-shaped bracket 153a and through a washer-like disc or thrust plate member 200 as well as through a coil spring 154a reactively disposed between said bracket and disc. A nut 155a threadably secured to the end of bolt 150a serves to position the bracket 153a, while the disc 200 abuts a shoulder 156a in the enlarged bore 90a.

The opposite end of spool 126a has an axial recess 201 therein that is threaded to receive an extension spool 202 which is slidable through opening 197 in coverplate 93a and which extends therebeyond into the bonnet cover 198. Axially spaced annual grooves 203 and 204 in said extension member are adapted to cooperate with a contracting garter spring 205, disposed in an annular groove 206 in plate cover 93a, to provide detent means for holding the valve spool in certain axially displaced positions thereof. Groove 203, for instance, is positioned to receive garter spring 205 when the valve is conditioned for lowering the fluid motor piston associated therewith, while groove 204 accommodates said spring when the valve is moved to its float position. It will be appreciated, of course, that additional detent means such as the groove shown at 207 may be provided for other positions of the valve, if desired, without deviating from any of the teachings of the present invention.

In Figure 17 there is schematically represented a combined hydraulic system, generally similar to the one shown in Figures 1 and 16, but wherein additional fluid delivery passage means have been provided between the final open-center type valve and the first valve of the closed-center type in the system. An interchange bridge or interconnecting adapter plate, indicated at 208 (Figures 17-20), is fashioned from a head member 209 having the front and reverse faces 210 and 211 thereof smoothly finished and parallel to one another, and having a plurality of peripherally spaced openings, such as 212, extending between said faces. A through passage 213 with a port 214 in the front face and a port 215 in the back face has a counterbore 216 which is adapted to receive an O-ring 217 (Figure 20) therein. A fluid delivery or inlet port 218 in the front face 210 communicates by way of a passage 219 with a similar inlet port 220 opening in said front face, and by way of passage 221 with an outlet port 222 opening in the reverse face, while a counterbore 223 in said latter port is adapted to receive an O-ring such as indicated at 217. An inlet port 224 opening in the said front face communicates by way of a passage 225 with a port 226 opening in an edge face portion 227 thereof and said latter port opening may be threaded, as indicated, to connectably receive the pressure conduit line 29. The adapter plate 208 is adapted for positioning between the respectively disposed valve faces and may be fixedly secured therebetween by the tie-bolts 161 which serve to tie all the valve units in the assembly together.

OPERATION

In order to best understand the operation of the proposed invention reference is had to the schematic diagram of Figure 1, wherein three hydraulic control valves are illustrated as arranged for a banked operation with each valve shown conditioned for a different operating position, such positions having been set by the respective operating mechanisms thereof.

Fluid pressure from the hydraulic pump 10 is directed by way of conduit 11 to the manifold tower 12 thence into the inlet ports 104, 108 and 114 of the first valve 14. With the initial valve 14 in position for raising or lifting its associated hydraulic motor 16 the spool thereof will be positioned as indicated and fluid is then free to flow from port 104 around groove 144 and out work port 100 into conduit 17 and against the lifting surface of piston 15 in the hydraulic motor or ram 16, while the opposite side of said piston, being connected by conduit 18 to the work port 118, communicates by way of recess 119 and passage 120 with the return fluid chamber 88 of the valve. Thus, as the piston 15, in hydraulic motor 16, is raised the fluid exhausted therefrom is directed back to the return circuit and, by way of return port 122, into the next valve in the system. At the same time fluid under pressure passes from fluid delivery port 115, of valve 14, to pressure port 114a of the adjoining valve 14a, where it is available for use as required, and fluid passing through port 104, annular recess 144 and port 105 of said initial valve is delivered into port 104a of the adjoining valve 14a.

Furthermore, when the spool 126 of first valve 14 is moved so that this valve becomes conditioned for lowering the piston of its associated ram unit the spool will be positioned for directing fluid pressure from port 104 around groove 144 and through port 105 into the respective port 104a of the adjacent valve, while fluid pressure entering inlet port 114 is directed by way of outlet port 115 into the respective inlet port 114a of said adjacent valve so that fluid pressure is then available at ports 104a and 114a for use upon operation of said latter valve. Thus, it will be appreciated that the fluid pressure entering the initial valve 14 is available for raising or lowering the fluid motor 16 associated therewith and simultaneously for providing fluid pressure at ports 104a, 108a and 118a of the adjoining valve for use in operation of the fluid motor 20 associated with said latter valve.

With the second valve 14a in the system conditioned for its lowering or dropping operation the spool therein will be positioned as indicated in Figure 1 and the fluid pressure delivered at port 114a thereof will be directed by way of groove 146a to port 118a from where it is conveyed through conduit 22 to the lowering side of piston 19 of the fluid motor or ram unit 20. Since the opposite side of piston 19 communicates by way of conduit 21 with port 100a the fluid on that side of the piston is free to pass through said conduit into said latter port and thence past the land 140a and into the return flow end chamber 88a which communicates by way of port 122a with the corresponding return flow port of the next adjoining downstream valve and from there through the discharge means 50 to return line 30 that, in turn, empties by way of line 32 into reservoir 33 which, of course, is connected by way of conduit 34 with the inlet of pump 10. Since fluid pressure is also simultaneously available at ports 104a and 108a in said second valve the spool 126a thereof may be shifted to its raising or lifting position whereupon pressure would then be available for passage through port 100a and conduit 21 into the raising side of fluid motor 20. Thus, it will be seen that this second valve may be operated for raising and lowering while the first or preceding valve is in either its raising or lowering positions. It will be noted, however, that there is no fluid pressure available at port 47 in the third or succeeding valve 23 during these operations, hence this last valve cannot be operated to actuate an associated hydraulic device when either of the preceding valves 14 and 14a are in their raising or lowering operating positions.

In Figure 16 there is a schematic showing of a hydraulic system, generally similar to the one shown in Figure 1, but having the control valves shown conditioned for different operating sequences. In this instance the first valve 14 is in neutral, and the second valve 14a is in float position, while the final valve 23 is in its raising or lifting position. When the first valve 14 is in neutral fluid is trapped against movement in the conduits 17 and 18 and the piston 15 of fluid motor 16 is maintained in a hold position. Fluid pressure now entering inlet port 108 in said valve passes around groove 145 and out through port 111 into inlet port 108a of the immediately adjoining valve 14a. With the second valve 14a in its float position, such as is indicated in Figure 16, fluid pressure received at port 108a thereof is directed by way of groove 144a into port 111a which communicates with the inlet port 47 of the next adjoining valve 23 and with the pressure line 29. With valve 14a in the float position the raising side of piston 19, of fluid motor 20, freely communicates by way of conduit 21 and port 100a with the return flow end chamber 88a, while the lowering side of said piston freely communicates by way of conduit 22 and ports 118a and 119a also with the return flow chamber 88a, and since said latter ports and the return flow chamber are interconnected by the passage 120a the piston is free to float within the cylinder of said fluid motor. Now, since pressure is available at the port 47 of fluid valve 23 when such last valve in the system is moved to its lifting or raising position fluid pressure will pass by way of passage 46 out through port 44 into conduit 26 and into the raising side of piston 24 of the fluid motor or ram unit 25 associated therewith, while the lowering side of said piston, which connects with conduit 27, relieves the pressure therewithin by directing fluid through said conduit and port 43 into the passage 45 which communicates by way of port 49 with the exhaust passage means 50 and return conduit line 30. Thus, so long as fluid pressure is available at port 47 the valve 23 may be operated, as previously described, from one position to another for actuating the fluid motor 25 associated therewith. As previously outlined, fluid pressure is available at this port normally only when the first valve is in neutral and the second valve is either in a neutral or a float position.

In the schematic diagram represented by Figure 17 the proposed hydraulic system is shown as incorporating therein an adapter connector 208 which provides additional passage means whereby the final valve unit in the proposed system becomes operable for actuating its associated fluid motor regardless of the operating positions of any of the preceding valves in said system. For purposes of illustrating this possibility the middle valve 14a is shown (in Figure 17) in its lowering or dropping position whereupon fluid pressure received therein by way of port 104a is directed through outlet port 105a and inlet port 218 into passage 219 of the adapter 208 thence by way of port 222 in said adapter into the pressure port 47 of final valve 23 where said fluid pressure becomes available for use by the latter valve for actuating its associated fluid motor 25. At the same time fluid under pressure delivered to middle valve 14a by way of inlet port 114a is divided and a portion thereof is passed by way of outlet port 115a and inlet port 220 into passage 222 of said adapter, while the balance is directed by way of work port 118a and conduit 22 into the lowering side of the fluid motor or ram unit 20. Hence, it will be appreciated that so long as fluid pressure is available at either port 105a or 115a of the intermediate valve 14a there will be pressure available at inlet port 47 of the final valve 23 for use upon operation of said latter valve. When middle valve 14a is conditioned for raising, for example, the spool therein will then be disposed so that fluid under pressure delivered at port 104a is divided with part going into conduit 21 for raising fluid motor 19 and the remainder going by way of ports 105a and 218 into passage 219 of the adapter connector 208. At the same time fluid under pressure delivered to port 114a of said middle valve is directed by way of port 115a into the passage 219 of said adapter. Thus, regardless of the operated position of middle valve 14a fluid pressure will be available at port 47 in final valve 23 for use in connection with the operation thereof for actuating an associated hydraulic device.

Variants in structure of individual components of the system disclosed will readily occur to skilled designers in the field. Accordingly, even though particular embodiments and applications of the invention have been shown and described in some detail, there is no intention to thereby limit the invention to such specific forms or the particular employments here indicated. On the contrary, the intention is to cover all modifications and alternative arrangements falling within the spirit and scope of the present invention as expressed in the appended claims.

What is claimed is:

1. A hydraulic power transmitting apparatus comprising, in combination: a single source of fluid pressure; a first hydraulic control valve unit having a plurality of inlet and outlet ports therein and connected through certain of said inlet ports with said source of fluid pressure; a hydraulic motor connected to certain of said outlet ports of said first valve and actuable upon operation of said first valve; a second hydraulic valve of the type having a plurality of fluid accommodating ports and adapted for positioning control of an associated hydraulically actuated device; a second hydraulic motor connected to said second valve and actuable upon operation of said second valve; pressure regulating means interconnected between said second valve and said source of fluid pressure; one of the ports of said second valve being disposed in fluid pressure communication relation with a certain outlet port of said first valve, said certain outlet port being simultaneously in fluid pressure communication relation with said pressure regulator whereby fluid pressure may be transmitted therebetween; said first valve including a valve body having a bore therein and a spool slidably disposed within said bore, and fluid passage means formed in said body and cooperative with said spool for interconnecting certain of said ports to establish fluid pressure communication therebetween and from the said source through said ports to said associated hydraulic motor, said spool being slidable axially within said bore whereby said spool is positioned in any one of a plurality of axially displaced positions during two of which positions fluid pressure communication is established by way of said passage means between the said source and said associated hydraulic motor to effect the operation of said motor while simultaneously fluid pressure communication from said source through said first valve to said second valve is interrupted, and during another of said axially displaced positions of the spool fluid pressure communication to said associated hydraulic motor is interrupted while simultaneously fluid pressure communication is established from the source through said first valve by way of said passage means to said second valve and to said pressure regulator.

2. A hydraulic power transmitting apparatus comprising, in combination: a single source of fluid pressure; a first hydraulic control valve unit having a plurality of inlet and outlet ports therein and connected through certain of said inlet ports with said source of fluid pressure; a hydraulic motor connected to certain of said outlet ports of said first valve and actuable upon operation of said first valve; a second hydraulic valve of the type adapted for positioning control operation, and having a plurality of fluid accommodating ports therein; a second hydraulic motor connected to said second valve and actuable upon operation of said second valve; pressure regulating means operatively connected between said second valve and said source of fluid pressure; means providing a plurality of interconnecting passages operatively disposed between said first and second valves communicatively connecting two of the outlet ports of said first valve with one of the ports of said second valve, and one of the outlet ports of said first valve with said pressure regulator means whereby fluid pressure may be transmitted therebetween; said first valve including a valve body having a bore therein and a spool slidably disposed within said bore, and fluid passage means formed in said body and cooperative with said spool for interconnecting certain of said ports to establish fluid pressure communication therebetween and from the said source through said ports to said associated hydraulic motor, said spool being slidable axially within said bore whereby said spool is positioned in any one of a plurality of axially displaced positions during two of which positions fluid pressure communication is established by way of said passage means between the said source and said associated hydraulic motor to effect the operation of said motor while simultaneously fluid pressure communication is established from said source through said first valve to said second valve, and during another of said axially displaced positions of the spool fluid pressure communication to said associated hydraulic motor is interrupted while simultaneously fluid pressure communication is established from the source through said first valve by way of said passage means to said second valve and to said pressure regulator.

3. In a hydraulic power transmitting apparatus having a source of fluid pressure which is transmitted through one or more valve means to hydraulic units associated, respectively, with the valve means to effect the operation of said units, a control valve, comprising, in combination: a manifold member including a single inlet port therein adapted for fluid pressure communication with said source of fluid pressure, a plurality of outlet ports disposed in one face of said manifold, and passage means establishing communication between said outlet ports and said single inlet port; a valve body having a longitudinally extending bore therethrough; said bore having a plurality of axially spaced annular recesses opening therein; said body having a plurality of inlet, outlet and work ports and means forming a plurality of passages communicatively interconnecting certain of said ports and recesses, and having said work ports additionally connected to an associated hydraulic unit; a spool slidably positioned within said bore; said spool being fashioned with a plurality of lands and grooves with the grooves disposed between said lands; an adapter member including a plurality of inlet ports therein, a pair of outlet ports, and passage forming means therein, with said passage means, respectively, establishing communication between two of said inlet ports and one of said outlet ports and between another one of said inlet ports and the other one of said outlet ports; the outlet ports of said adapter member being adapted for communication either with other valve units or with the source of fluid pressure; said manifold member and said adapter member being secured to said valve body so that the outlet ports of said manifold communicatively register with the inlet ports of said valve body, while the inlet ports of said adapter member communicatively register with respective outlet ports of said valve body; means for axially sliding said spool within said bore whereby said spool is positioned in any one of a plurality of axially displaced positions during certain of which positions fluid pressure is directed by way of certain of said plurality of passages to the hydraulic unit communicatively connected to the work ports of the respective valve to effect the operation of said unit while simultaneously fluid pressure communication is established by way of others of said plurality of passages between certain of the inlet and outlet ports, and during another axially displaced position of said spool fluid pressure communication is established by way of certain of said plurality of passages only between all of said inlet and outlet ports of said valve; and means disposed at one end of said bore for urging said spool to a position wherein no fluid pressure is directed from said source to the hydraulic unit connected to said work ports.

4. In a hydraulic power transmitting apparatus having a source of fluid pressure which is transmitted through one or more valve means to hydraulic units associated, respectively, with the valve means to effect the operation of said units, a control valve, comprising: a valve body having a longitudinally extending bore therethrough; said bore having a maximum of seven axially spaced and radially inwardly opening annular recesses with the first of said recesses disposed proximate one end of said bore, and with the second, third, fourth, fifth, sixth and seventh of said recesses disposed in consecutive order between the said first recess and the opposite end of said bore; said body having a plurality of ports formed therein and having means in said body providing a plurality of passages communicatively interconnecting certain of said ports and recesses; said first and sixth recesses being connected by certain of said passages for fluid pressure communication with an associated hydraulic unit, and the second, third and fifth recesses being connected by other of said passages for communication with the source of fluid pressure, while the second, fourth, fifth and seventh recesses are connected by others of said passages for communication either with other valve units or with the source of fluid pressure; a spool member slidably disposed within the bore and adapted for axial movement into a plurality of positions therewithin; said spool having a maximum of four axially spaced lands with three radially outwardly opening grooves therebetween; means for axially displacing said spool within said bore whereby certain of said recesses cooperate with certain of the lands and grooves on said spool to condition said valve selectively for each of a plurality of operating positions during certain of which positions fluid pressure communication is established between said source and said associated hydraulic unit and between certain of said ports, while in another position of said valve fluid pressure communication is not established between said source and said associated hydraulic unit but is established between certain of said ports; and means disposed at one end of said bore for urging said spool to a neutral position wherein no fluid pressure is directed to the associated hydraulic unit.

5. In a hydraulic power transmitting apparatus having a source of fluid pressure which is transmitted through one or more valve means to hydraulic units associated, respectively, with the valve means to effect the operation of said units, a control valve, comprising: a valve body having a front face and a reverse face parallel to said front face, and having at least one side face extending between said front and reverse faces; said body having a longitudinally extending bore therethrough; a spool member slidably disposed within the bore and adapted for axial movement into a plurality of axially displaced positions therewithin; said bore having a maximum of seven axially spaced and radially inwardly opening annular recesses with the first of said recesses disposed proximate one end of said bore, and with the second, third, fourth, fifth, sixth and seventh recesses disposed in consecutive order between the said first recess and the opposite end of said bore; said front face having a plurality of fluid inlet ports and a return fluid port therein, and said reverse face having a plurality of fluid outlet ports and a return fluid port therein and having the ports on said front face disposed in axial alignment with the ports on said reverse face wherefore reverse face ports of one such valve unit will respectively communicatively register with the front face ports in another of such valve units should the units be assembled with the reverse face of one against the front face of the other; said side face having a pair of work ports formed therein; passage means formed in said body individually communicatively, respectively, connecting one of said inlet ports with one of said outlet ports and with said second recess, one of said inlet ports with said third recess, one of said outlet ports with said fourth recess, one of said inlet ports with one of said outlet ports and with said fifth recess, one of said work ports with said first recess and the other of said work ports with said sixth recess, and said seventh recess with the return ports on said front and reverse faces; said inlet ports being adapted for fluid pressure communication with a source of fluid pressure, and said work ports being adapted for fluid pressure communication with a hydraulic unit associated with said valve, and said outlet and return ports being adapted for fluid pressure communication either with other valve units or with the source of fluid pressure; means for axially displacing said spool within said bore whereby said valve is conditioned selectively for each of a plurality of operating positions; and means disposed at one end of said spool and reactive against said body for urging said spool to an inoperative position.

6. In a hydraulic power transmitting apparatus wherein a plurality of hydraulic devices are individually actuated with fluid pressure received from a common source of fluid pressure and controlled by a plurality of respectively associated valve means, a control valve, comprising: a valve body having oppositely disposed front and back faces and at least one side face extending between said front and back faces; said body having an enlarged recess at one end thereof delimiting a chamber and a small recess at the opposite end thereof delimiting a small chamber, and having cover means detachably secured to said body over respective open ends of said chambers; said body having a longitudinal bore extending therethrough and opening into said chambers; a spool member slidably disposed within the bore and extending into said enlarged chamber and adapted for axial movement into a plurality of positions axially displaced from a neutral position within said bore; said bore having seven axially spaced and radially inwardly opening annular recesses with the first recess disposed proximate one end of said bore and with the second, third, fourth, fifth, sixth and seventh recesses disposed in consecutive order between the said first recess and the opposite end of said bore, said front face having a set of ports including one return and three inlet ports therein, and said back face having a set of ports including one return and three outlet ports therein, and having the set of ports on said front face disposed in alignment with the set of ports on said back face whereby the back face ports of one such valve unit will respectively communicatively register with the front face set of ports in another of such valve units should the units be assembled with the back face of one against the front face of the other; said side face having a pair of work ports formed therein and which ports are communicatively connected to a hydraulic unit associated therewith; said body having individual passage means formed therein for, respectively, communicatively connecting one of said inlet ports with one of said outlet ports and with said second recess, another of said inlet ports with said third recess, another of said outlet ports with said fourth recess, another one of said inlet ports with another one of said outlet ports and with said fifth recess, one of said work ports with said first recess and the other of said work ports with said sixth recess, and said seventh recess with the return ports on said front and back faces and with said enlarged chamber; said inlet ports being adapted for fluid pressure communication with the source of fluid pressure, and said outlet ports and return ports being adapted for communication either with other valve units or with the source of fluid pressure, means projecting into said enlarged chamber for axially displacing said spool within said bore whereby said valve is conditioned selectively for each of a plurality of operating positions; spring means in said small chamber disposed for reaction between said valve body and said spool for centering said valve to a neutral position wherein there is no fluid pressure communication between the source and said associated hydraulic unit.

7. In a hydraulic power transmitting apparatus having a common source of fluid pressure which is transmitted through one or more valve means to hydraulic units associated, respectively, with the valve means to effect the operation of said units, a control valve, comprising: a valve body having a longitudinally extending bore therethrough; separate cover means detachably secured one at each end of the valve body to cover the ends of said bore; said bore having a maximum of seven axially spaced and radially inwardly opening annular recesses with the first of said recesses disposed proximate one end of said bore, and with the second, third, fourth, fifth, sixth and seventh of said recesses disposed in consecutive order between the said first recess and the opposite end of said bore; said first and sixth recesses being adapted for fluid pressure communication with an associated hydraulic unit, and the second, third and fifth recesses being adapted for communication with the source of fluid pressure, while the second, fourth, fifth and seventh recesses are adapted for communication either with other valve units or with the source of fluid pressure; a spool member slidably disposed within the bore and adapted for axial movement in both directions from a neutral position within said bore whereby said valve is conditioned selectively for each of a plurality of operating positions; said spool having a maximum of four axially spaced lands with three radially outwardly opening grooves disposed therebetween; means for axially displacing said spool from neutral position within said bore; centering means, disposed at one end of said bore for urging said spool to a neutral position, including a pair of inwardly facing retainer cups having a spring reactively disposed therebetween, and having one of said cups slidably attached to said spool and the other of said cups disposed in one position of the spool to abut an end portion of said spool and in another position of the spool said other of said cups is disposed to abut against said valve body.

8. In a hydraulic power transmitting apparatus having a common source of fluid pressure which is transmitted through one or more valve means to hydraulic units associated, respectively, with the valve means to effect the operation of said units, a control valve, comprising: a valve body having a longitudinally extending bore therethrough; separate cover means detachably secured one at each end of the valve body to cover the ends of said bore; said bore having a maximum of seven axially spaced and radially inwardly opening annular recesses with the first of said recesses disposed proximate one end of said bore, and with the second, third, fourth, fifth, sixth and seventh of said recesses disposed in consecutive order between the said first recess and the opposite end of said bore; said first and sixth recesses being adapted for fluid pressure communication with an associated hydraulic unit, and the second, third, and fifth recesses being adapted for communication with the source of fluid pressure, while the second, fourth, fifth and seventh recesses are adapted for communication either with other valve units or with the source of fluid pressure; a spool member slidably disposed within the bore and adapted for axial movement in both directions from a neutral position within said bore whereby said valve is conditioned selectively for each of a plurality of operating positions; said spool having a maximum of four axially spaced lands with three radially outwardly opening grooves disposed therebetween; means for axially displacing said spool from neutral position within said bore;

centering and stop means, disposed at one end of said bore for urging said spool to a neutral position, including a pair of inwardly facing retainer cups having a coil spring reactively disposed therebetween, and having one of said cups slidably attached to said spool and the other of said cups disposed in one position of the spool to abut an end portion of said spool, and in another position of the spool, said other of said cups is disposed to abut against said valve body; said centering and stop means being disposed and dimensioned so that when said spool is axially displaced in one direction from neutral the cup retainers will be in contact with one another and one cup thereof will engage the respective proximate body cover to provide stop means for fixing the travel of said spool in said one direction, and when said spool is axially displaced in the other direction from neutral the cup retainers will be in contact with one another and one cup thereof will engage an edge portion of said body proximate the end of said bore to provide stop means for fixing the travel of said spool in said other direction.

9. In a hydraulic power transmitting apparatus wherein a plurality of hydraulic devices are individually actuable with fluid pressure from a common source of fluid pressure and the actuation of said devices is controlled by a plurality of respectively associated valve means, a control valve, comprising: a valve body having oppositely disposed front and back faces and at least one side face extending between said front and back faces; said body having an enlarged recess at one end thereof delimiting a chamber and a small recess at the opposite end thereof delimiting a small chamber, and having cover means detachably secured to said body over respective open ends of said chambers; said body having a longitudinal bore extending therethrough and opening into said chambers; a spool member slidably disposed within the bore with one end thereof extending through said enlarged chamber and adapted for axial movement into a plurality of four positions within said bore; detent means cooperative between said spool and said enlarged chamber cover and operative for holding said spool selectively in a plurality of axially displaced positions within said bore; said bore having seven axially spaced and radially inwardly opening annular recesses with the first recess disposed proximate one end of said bore and with the second, third, fourth, fifth, sixth and seventh recesses disposed in consecutive order between the said first recess and the opposite end of said bore; said front face having a set of ports including one return and three inlet ports therein, and said back face having a set of ports including one return and three outlet ports therein, and having the set of ports on said front face disposed in alignment with the set of ports on said back face whereby the back face ports of one such valve unit will respectively communicatively register with the front face set of ports in another of such valve units should the units be assembled with the back face of one against the front face of the other; said side face having a pair of work ports formed therein and which ports are communicatively connected to a hydraulic unit associated therewith; said body having individual passage means formed therein for, respectively, communicatively connecting one of said inlet ports with one of said outlet ports and with said second recess, another of said inlet ports with said third recess, another of said outlet ports with said fourth recess, another one of said inlet ports with another one of said outlet ports and with said fifth recess, one of said work ports with said first recess and the other of said work ports with said sixth recess, and said seventh recess with the return ports of said front and back faces and with said enlarged chamber; said inlet ports being adapted for fluid pressure communication with the source of fluid pressure, and said outlet and return ports being adapted for communication either with other valve units or with the source of fluid pressure; means projecting into said enlarged chamber for axially displacing said spool in both directions from a neutral position within said bore whereby said valve is conditioned selectively for each of a plurality of three operating positions; centering means, in said small chamber urging said spool to a neutral position; including a spring retainer cup slidably attached to said spool and a disk-like abutment member with a spring reactively disposed between said cup and said abutment, and having said abutment member disposed in one position of the spool to rest in abutting relation against one end of the spool and in another position of the spool, said abutment member is disposed to rest abuttingly against an inner edge portion of said small recess.

References Cited in the file of this patent

UNITED STATES PATENTS

| | | |
|---|---|---|
| 2,247,140 | Twyman | June 24, 1941 |
| 2,284,413 | Frentzel | May 26, 1942 |